: US006098813A

United States Patent [19]
Cini

[11] Patent Number: 6,098,813
[45] Date of Patent: Aug. 8, 2000

[54] WASTE WATER GREASE FILTER

[75] Inventor: Charles Cini, Toronto, Canada

[73] Assignee: Rhino Ecosystems Inc., Weston, Canada

[21] Appl. No.: 09/194,910

[22] PCT Filed: Jun. 4, 1997

[86] PCT No.: PCT/CA97/00377

§ 371 Date: Dec. 4, 1998

§ 102(e) Date: Dec. 4, 1998

[87] PCT Pub. No.: WO97/46300

PCT Pub. Date: Dec. 11, 1997

[30] Foreign Application Priority Data

Jun. 5, 1996 [CA] Canada ................................ 2178270

[51] Int. Cl.[7] .................................................. B01D 35/00
[52] U.S. Cl. ................... 210/356; 210/257.2; 210/416.1
[58] Field of Search .................................. 210/499, 483, 210/500.23, 356, 416.1, 257.2

[56] References Cited

U.S. PATENT DOCUMENTS

| | | |
|---|---|---|
| 1,284,944 | 11/1918 | Pierre . |
| 2,792,943 | 5/1957 | Mackintosh .............................. 210/448 |
| 3,011,644 | 12/1961 | Farrell et al. ........................... 210/237 |
| 3,771,664 | 11/1973 | Schrink et al. .......................... 210/448 |
| 3,959,138 | 5/1976 | Nichols ..................................... 210/94 |
| 3,960,728 | 6/1976 | Otzen ...................................... 210/167 |
| 3,960,733 | 6/1976 | Van Dieren ............................. 210/460 |
| 4,045,351 | 8/1977 | Peterson ................................. 210/238 |
| 4,058,479 | 11/1977 | White et al. .......................... 252/301.1 |
| 4,259,188 | 3/1981 | Morgan .................................. 210/448 |
| 4,303,519 | 12/1981 | DelVecchio ............................ 210/238 |
| 4,622,148 | 11/1986 | Williniger .............................. 210/615 |
| 4,983,282 | 1/1991 | Roy et al. ............................. 210/257.2 |
| 5,256,279 | 10/1993 | Voznick ................................ 210/257.2 |
| 5,286,387 | 2/1994 | Froud ..................................... 210/649 |
| 5,372,718 | 12/1994 | Zebian ................................... 210/301 |
| 5,492,619 | 2/1996 | Batten ..................................... 210/86 |
| 6,040,491 | 3/2000 | Sjowall ................................ 210/416.1 |

FOREIGN PATENT DOCUMENTS

| | | |
|---|---|---|
| 0687493 | 4/1995 | European Pat. Off. . |
| WO96/01776 | 1/1996 | Japan . |
| WO96/01776 | 1/1996 | WIPO . |

*Primary Examiner*—David A. Simmons
*Assistant Examiner*—Chester T. Barry
*Attorney, Agent, or Firm*—Philip C. Mendes da Costa Bereskin & Parr

[57] ABSTRACT

A waste water filter system has a collector body (14), a disposable filter (20) positioned within the collector body which retains particulate matter and grease while not retaining waste water, and an access aperture (28) in the collector body for removing and replacing the filter.

14 Claims, 4 Drawing Sheets

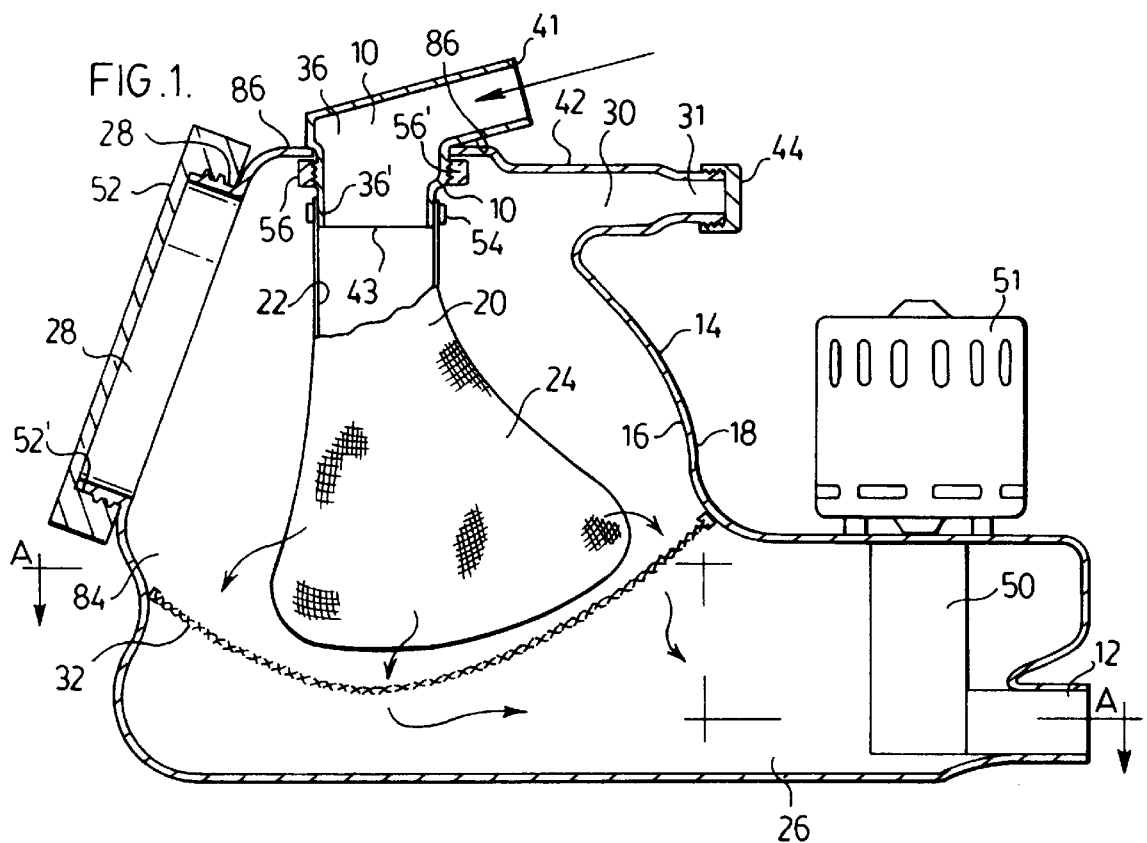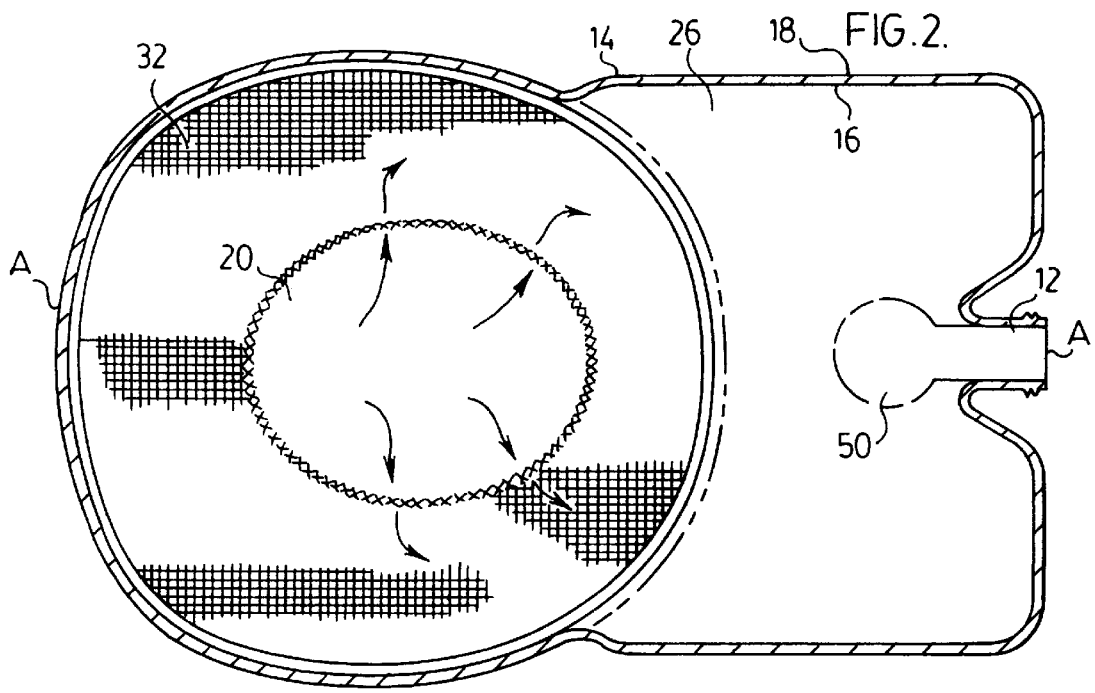

WASTE WATER GREASE FILTER

FIELD OF THE INVENTION

The present invention relates to a system with a removable filter for filtering particulate matter and/or grease from waste water. In one embodiment, this invention relates to a filtration unit for removing grease and solid organic material from waste water, such as the waste water that is produced in an industrial kitchen (such as a restaurant kitchen)

BACKGROUND OF THE INVENTION

Water is heavily used in industrial, commercial and residential settings during the preparation of food including the cleaning of containers, cookware and utensils used in cooking. This produces a consequent amount of waste water which typically contains a substantial amount of organic matter, including solid particulate matter and grease. Grease which enters the public sewage system may be treated at sewage treatment plants at a substantial cost. In industrial and commercial settings, some local governments mandate the use of grease trap collection units to minimize the volume of grease entering the public sewage system.

The construction of grease traps is known in the art. Standard grease trap collection units consist of settling tanks for the collection of grease and other organic matter. The grease trap collection units are typically positioned as part of the waste water flow path from the source of the waste water (eg. a kitchen) to, eg., a municipal waste water line. The grease trap collection units may not separate grease from the waste water efficiently as the flow therethrough deters the settling out of the grease. As grease and solid particulate matter build up in the grease trap, the efficiency of the grease trap tends to decrease.

Excessive grease in waste water systems may result in excessive bacteria, may attract vermin or insects, may cause blocked pipes and reduced flow rates in sinks, and may allow noxious odours to enter a kitchen through waste water drains. Accordingly, standard grease trap collection units may require the regular service of a grease removal specialist to empty the trap and dispose of the grease and other matter that has built up therein.

European patent application No. 0,373,048 to Deshayes teaches a waste water filter unit having a filter inside a collector body, for removing solid organic matter from waste water. This filter unit works on a principle similar to that of a conventional grease trap, wherein particulate matter either floats to the top, or settles to the bottom of the water held in the collector body. Instead of using baffles to prevent the agitation of water moving through the collector unit, a non-deformable filter bag is used to retain the particulate matter.

European Patent Application No. 0,687,493 to Passavant-Werke AG teaches an apparatus for recycling organic compounds from sewage. The apparatus comprises a collector body containing either a solid, drum-like screen cage which is lined with a filter bag or a filter bag which sits on structural supports, and a pump for pumping the filtrate back into the collector body.

SUMMARY OF THE INVENTION

In accordance with the instant invention, there is provided a waste water filter system for removing solid organic particulate matter and grease from waste water comprising:

(a) a collector body having an inflow aperture for receiving the waste water, an outflow aperture and an inner surface, the collector body defining a flow path for the waste water extending in a forward flow direction from the inflow aperture, through the collector body, and out the outflow aperture;

(b) a removable filter;

(c) a retainer for releasably securing the removable filter in the collector body;

characterized in that the removable filter is expandable as it fills, and the removable filter is suitable for removing a portion of the solid organic particulate matter and grease from the waste water, and the removable filter is positioned in said collector body between the inflow aperture and the outflow aperture, and the removable filter has an outer surface and a reservoir for storing the solid organic particulate matter and grease removed from the waste water, and the removable filter is sized so that, when the reservoir is full, at least a portion of the outer surface of the removable filter is spaced from the inner surface of the collector body and defines a passageway in flow communication with the outflow aperture.

In accordance with another embodiment of the invention, there is provided a waste water filter system for removing particulate matter and grease from waste water, the waste water filter system including a waste water supply line in flow communication with a source of waste water containing particulate matter and grease, a filtration unit positioned downstream from the supply line and a grease trap positioned downstream from the filtration unit, the filtration unit comprising:

(a) a collector body having an inflow aperture for receiving the waste water, an outflow aperture and an inner surface, the collector body defining a flow path for the waste water extending in a forward flow direction from the inflow aperture, through the collector body, and out the outflow aperture;

(b) a removable filter for removing particulate matter from the waste water, the removable filter positioned in the collector body between the inflow aperture and the outflow aperture, the removable filter having an outer surface and a reservoir for storing the particulate matter removed from the waste water; and, (c) a retainer for releasably securing the removable filter in the collector body whereby the waste water exiting the filter contains a reduced amount of particulate matter and a reduced amount of particulate matter lodges in the grease trap.

In one embodiment, the removable filter comprises a filter bag having an inflow aperture in flow communication with the inflow aperture of the collector body whereby the waste water flows through the inflow aperture of the collector body, through the inflow aperture of the removable filter and through the removable filter with at least a portion of the grease remaining in the removable filter. Preferably, the removable filter has openings sized to prevent fine particulate matter such as rice from flowing therethrough.

The removable filter bag may be made from a fabric material and preferably a grease retaining fabric. Preferably, the filter bag expands as it fills with waste material. The removable filter may comprise an elastic material. Preferably, the elastic material stretches in both the machine direction and the cross direction. The material of the removable filter may have a needle count from about 300 to about 500 and more preferably from about 300 to about 400. The openings in the removable filter are preferably sized to retain more than 50%, and preferably more than more than 75%, of the grease and particulate matter that enters the waste water filter system.

In another embodiment, the waste water filter system further comprises a support for supporting a portion of the removable filter as the removable filter is filled with waste material. The support may comprise a cradle and the collector body may have a cradle support located on the inner surface thereof for supporting the cradle below the removable filter whereby the lower surface of the removable filter rests on the cradle as the removable filter is filled with waste material.

In another embodiment, the collector body further comprises a bypass for diverting waste water from the inflow aperture of the removable filter. Accordingly, if waste water having a high solids content and a low grease content is to be produced, then this may be diverted around the removable filter instead of the removable filter becoming quickly filled with the solids. The bypass may comprise a bypass aperture positioned on the collector body in flow communication with the passageway. Aternately, if waste water having a high solids content and a low grease content is to be produced, then this may be diverted around the removable filter and around the grease trap, to prevent the grease trap becoming filled with the solids and not grease.

In order to assist in the removal of the removeable filter, the collector body may have a disposal aperture sized to permit the removal of the removable filter when the removable filter is full of waste material, and the retainer may comprise a member for releasably securing the inflow aperture of the filter bag in flow communication with the inflow aperture of the collector body and a member for releasably covering said disposal aperture.

In a further embodiment, the waste water filter system further comprises a pump positioned in the flow path upstream of the outflow aperture for pumping the waste water through the outflow aperture.

BRIEF DESCRIPTION OF THE DRAWINGS

These and other advantages of the present invention will be more fully and particularly understood in conjunction with the following description of the following drawings of preferred embodiments of the invention in which:

FIG. 1 is a side cross-sectional view of a waste water filter system, taken along the line A—A of FIG. 2.

FIG. 2 is a top cross-sectional view of a waste water filter system, taken along the line A—A of FIG. 1.

DETAILED DESCRIPTION OF A PREFERRED EMBODIMENT

Figure 3:
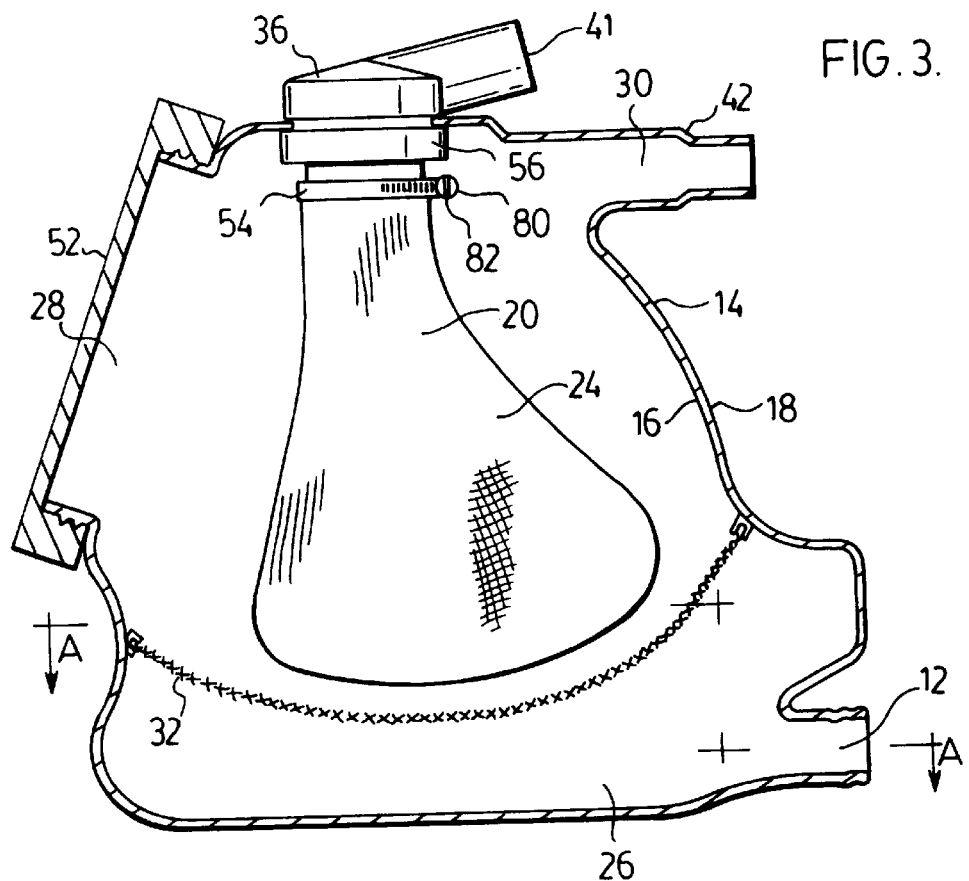
FIG. 3 is a side cross-sectional view of another embodiment of a waste water filter system, taken along the line A—A of FIG. 4.

For the purposes of promoting and understanding of the principles of the invention, reference will now be made to the embodiments illustrated in the drawings and specific language will be used to describe the same.

FIG. 1 is a preferred embodiment of a waste water filter system. The waste filter system comprises collector body or filtration unit 14 which has inner surface 16, outer surface 18, a reservoir 26, inflow aperture means 10, outflow aperture means 12 and access aperture 28. Filter means 20 is provided within collector body 14 and has inner surface 22 and outer surface 24. Between filter means 20 and reservoir 26 is cradle 32.

As shown in FIG. 1, waste water containing particulate matter and grease enters collector body 14 through inflow aperture means 10. The waste water flows through filter means 20, from inner surface 22 to outer surface 24, and leaves collector body 14 via outflow aperture means 12. Filter means 20 retains a portion of the grease and particulate matter that is too large to pass through filter means 20. Over time, as waste water flows through the system, filter means 20 fills with grease and other solid or viscous matter in the waste water. From time to time, or as required, filter means 20 may be removed and replaced with an empty filter means 20, through means of access aperture 28.

Collector body has an internal cavity for receiving filter means 20. The size of the cavity in collector body 14 may vary depending upon, for example, the anticipated grease content of the waste water, the daily flow of waste water and the period of time between replacement of filter means 20. For example, the cavity in collector body 14 may be sized so that filter means 20 need only be changed once a day. The cavity and filter means 20 are respectively sized so that, when filter means 20 is full, at least a portion of outer surface 24 of filter means 20 is spaced from inner surface 16 of collector body 14 to define passageway 84 which is in flow communication with outflow aperture means 12.

Collector body 14 is preferable made from a light-weight, high strength polymer, such as plastic. Alternately, collector body 14 may be made from other moldable polymers or from metal or fiberglass.

Figure 6:
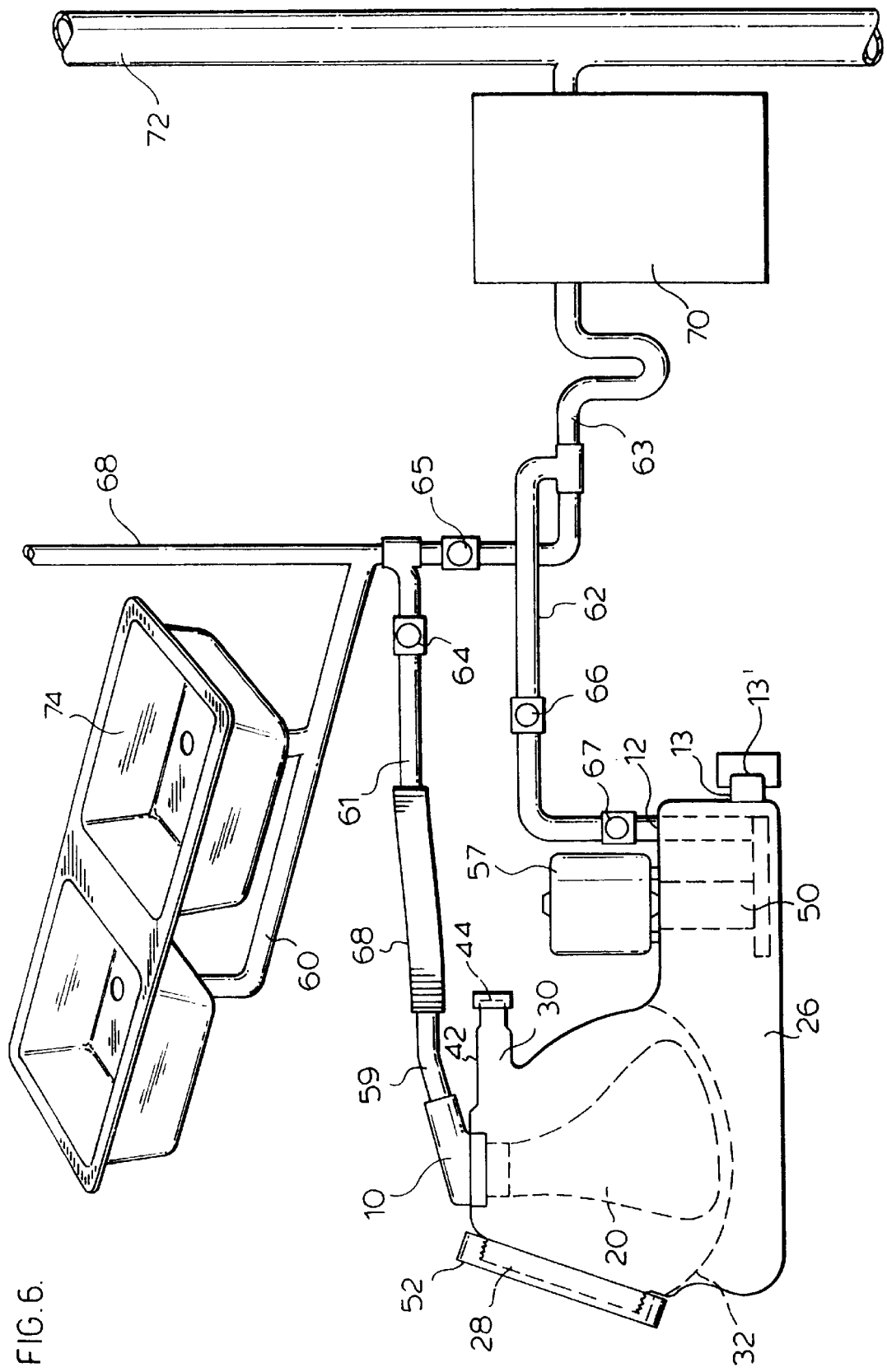
FIG. 6 is a schematic drawing of a waste water filter system of the present invention, with dotted lines showing some interior detail of the filter system, shown when connected to a kitchen waste water flow path.

Filter means 20 is preferably positioned in flow communication with inflow aperture means 10 such that substantially all, and more preferably all, of the waste water flowing through input aperture means 10 passes through filter means 20. Accordingly, inflow aperture means 10 may have passageway 36 extending from outer opening 41, through inflow aperture 10, to inner opening 43. Inflow aperture means 10 has a neck portion 36' which, at one end, is in flow communication with passageway 36 and, at the other end thereof, has inner opening 43. Outer opening 41 is sized to receive a waste water conduit as shown in FIG. 6. Preferably, inflow aperture means 10 is positioned in the upper portion of collector body 14 so that the water flows through collector body 14 by gravity feed.

Filter means 20 is releasably positioned in collector body 14 so that, for example, it may be removed from collector body 14 when it is full of grease and other matter and requires emptying. When filter means 20 is full, it may be removed from collector body 14, cleaned and resecured in collector body 14. Preferably, filter means 20 is disposable whereby, when filter means 20 is full, it may be removed from collector body 14 and discarded and a new filter means 20 may be placed in collector body 14.

Filter means 20 may be any filter material which is capable of filtering solid organic particulate matter from water. Filter means 20 may comprise a mesh or other porous material which has openings sufficiently small to allow liquids to pass from filter inner surface 22 to outer surface 24, while not allowing a substantial portion of the solid organic particulate matter to pass from filter inner surface 22 to outer surface 24. Filter means 20 may be a fabric and is preferably expandable so as to expand as filter means 20 fills. More preferably, the fabric is elastic. Most preferably, the fabric is elastic in both the machine direction and the cross direction.

The use of an elastic material has several advantages. First, the use of an elastic material may prevent premature rupture of the filter means. By using an elastic material, filter means 20 may expand when the rate of flow of waste water is high. Thus expansion increases the size of the openings in the filter material to allow for a larger flow rate therethrough. Secondly, as grease and solid materials accumulate within filter means 20, filter means 20 may expand to hold additional waste material. Thirdly, as waste material accumulates in filter means 20, the pores in the filter means will become blocked. As the filter means expands, the size of the pores will increase thus permitting more of the filter means to continue to effectively function as a filter. Preferably, the material expands at a rate such that the pores in the filter means do not increase so as to allow the excessive flow therethrough of waste material. The openings in the removable filter are preferably sized to retain more than 50%, and preferably more than more than 75%, of the grease and particulate matter that enters the waste water filter system.

The fabric may have a needle count from about 300 to about 500, more preferably from about 300 to about 400 and most preferably about 350. Such material may trap up to 80 or 90% of the solid organic particulate matter that enters the filter. Surprisingly, it has been found that, in addition to filtering a substantial portion of the solid organic material from waste water, these material are also effective at filtering grease from the waste water.

The amount of grease which is filtered will vary depending upon several factors including the temperature of the water entering filter means 20, the size of the pores in filter means 20 and the hold up time in filter means 20. By positioning the filtration unit distal from a waste water source, such as a kitchen sink, the waste water will lose some heat as it travels to the filtration unit. As the waste water enters the filtration unit, depending upon the size of the pores, it will remain in the filter means for an additional period of time. This provides an opportunity for the grease to change from a fluid state to a more viscous state. For example, the grease may gel or solidify. Due to the pore sizes of filter member 20, the gelled or solidified grease will tend to remain in the filtration unit decreasing the grease load in the waste water exiting the filtration unit and entering a grease trap posityoned downstream therefrom. Thus, instead of a grease trap having to be cleaned, for example, once a day, it may only have to be service, for example, one a week or once a month.

Filter means 20 may be made of various fabrics such as nylon, or another synthetic polyamide fibre having a protein-like structure, with tough, lightweight, elastic properties. Alternately, filter means 20 may be made of cotton, rayon, terylene, or other fabric known in the art.

Figure 5:
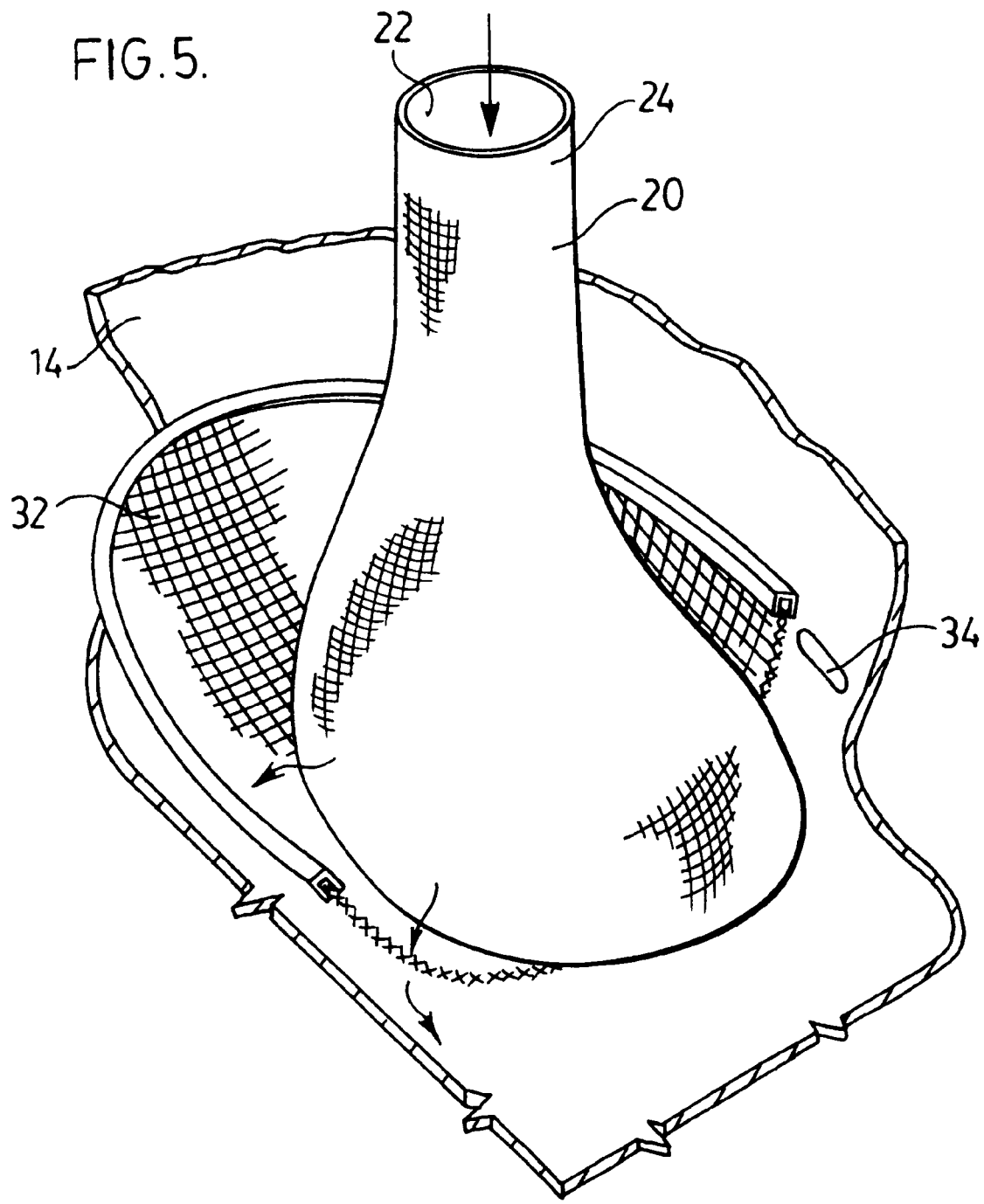
FIG. 5 is a perspective cut-away view of the interior of a waste water filter system.

Filter means 20 may be of any particular shape which may be placed in the flow path of the waste water to filter particulate matter and grease in the waste water. Filter means 20 preferably also includes a reservoir or other storage means for storing grease and solid matter filtered from the waste water. In one embodiment, filter means 20 comprises a longitudinally extending bag having an opening at one end thereof. Thus, filter means 20, when empty may be a hollow cylindrical member which is sealed at one end, and may expand as shown in FIG. 5 as said accumulation occurs.

To facilitate the removal of filter means 20 from collector body 14, filter means 20 is preferably releasably secured to inflow aperture means 10 by any means known in the art. As shown, in FIGS. 1 and 3, filter means 20 may be releasably secured by a releasable locking means, for example clamp 54 or like means, to neck portion 36'. Clamp 54 may comprise a longitudinally extending member which is threadingly engaged in head 80. Head 80 has a screw 82 which, when rotated, draws the longitudinally extending member through head 80 to tighten clamp 54. The open end of filter means 20 is positioned around neck portion 36' and clamp 54 is then placed around filter means 20 and tightened to create an interference or friction fit, thus securing filter means 20 in a desired position in a flow path. As the weight of filter means 20 increases during use, the frictional fit secures filter means 20 to inflow aperture means 10 so that filter means 20 does not separate from inflow filter means 10. Other suitable securing means known in the art which may be used to secure filter means 20 in position, including locking pins, spring clip fasteners and set screws.

Access aperture 28 is provided to facilitate the removal of filter means 20. Preferably, access aperture 28 is large enough to permit the removal of filter means 20 when filter means 20 is full with grease and solid wastes. As shown in FIGS. 1 and 3, cover 52 is preferably provided to releasable engage with collector body 14 such that, when engaged, access aperture 28 is closed. Access aperture 28 may have a threaded exterior surface 28' which engages threaded interior surface 52' of cover 52 so that cover 52 may be releasably secured on access cover 28 by screwing cover 52 thereon. Covering access aperture 28 may prevent noxious smells from being emitted from collector body 14, and may prevent infestation by vermin, insects, and airborne microorganisms.

In an embodiment of the invention, inflow aperture means 10 may be sized so that it is rotatably mounted in collector body 14. Further, inflow aperture means 10 may be integrally formed with collector body 14 or it may be releasably secured to collector body 14. In the latter case, the portion of passageway 36 having outer opening 41 may be positioned exterior to outer surface 18 of collector body 14 and the portion of inflow aperture means 10 having opening 43 may be positioned in collector body 14. Inflow aperture means 10 has shoulder members 86 so that inflow aperture means 10 may be seated on collector body 14. Inflow aperture means 10 may be releasably secured to collector body 14 by male and female engagement members. For example, inflow aperture means 10 may have threaded exterior surface 10' which is sized to threadingly receive securing ring 56 having threaded surface 56'. Other suitable connection means known in the art which may be used to secure inflow aperture means 10 into position include clamps, locking pins, spring clip fasteners, and set screws. Alternately, inflow aperture means 10 may be secured by means such as glue or the like.

As seen in FIGS. 2 and 3, cradle 32 may be located in the flow path between filter means 20 and reservoir 26. Cradle 32 may provide a platform for receiving the lower portion of filter means as grease accumulates in filter means 20. Thus, cradle 32 assists clamp 54 to retain filter means 20 in flow communication with inflow aperture means 10 despite the load caused by the filter's mechanical resistance to waste water passing through the filter and despite the load caused by an accumulation of grease and solids retained in filter means 20. Further, by supporting filter means 20, cradle 32 decreases the likelihood the filter means 20 may rip due to the load caused by the filter's mechanical resistance to waste water passing through the filter and the load caused by an accumulation of grease and solids retained in filter means 20.

Cradle 32 may be releasably engaged with collector body 14 by means of cradle supports 34 positioned around inner surface 16 of collector body 14 (see FIG. 5). Cradle supports 34 may comprise protrusions which extend into passageway 84. Cradle 32 may have mating detents for receiving these protrusions.

Cradle 32 has openings to permit water to pass therethrough and is preferably made from a non-elastic material and may be a mesh. Cradle 32 is may be made from a light-weight, high strength polymer, such as non-elastic plastic. Alternately, cradle 32 may be made from other moldable polymers or from metal or fiberglass.

Optionally, collector body 14 may further comprise bypass means for bypassing filter means 20 when, for example, the waste water has a high solids content (other than grease) which may rapidly fill filter means 20. In such a case, collector body may have bypass aperture 42 in flow communication with passageway 84. Bypass aperture 42 may have a passageway 30 and an inflow aperture 31. Inflow aperture 31 is adapted to be connected in flow communication with a waste water conduit which in turn may be in flow communication with, for example, a garbage disposal unit. Thus, a flow path may comprise a flow from a garbage disposal unit to inflow aperture 31, through passageway 30 and into collector body 14. In this embodiment, cradle 32 may be a fine or semi-fine mesh which may retain such solid materials which flow from said garbage disposal unit, through bypass aperture 42 to cradle 32. From time to time access aperture cover 52 may be removed and solid wastes may be removed from cradle 32 through access aperture 28, to facilitate the flow of waste water through cradle 32. Alternately, the mesh of cradle 32 may be sized to allow such solid material to pass therethrough.

Inflow aperture 31 may have a removable cover so that, if bypass aperture 42 is not required, it may be sealed. For example, inflow aperture 31 may have a threaded exterior surface for receiving in threaded engagement cap 44. Covering inflow aperture 31 may prevent noxious smells from being emitted from collector body 14, and may prevent infestation by vermin, insects, and airborne microorganisms.

Figure 4:
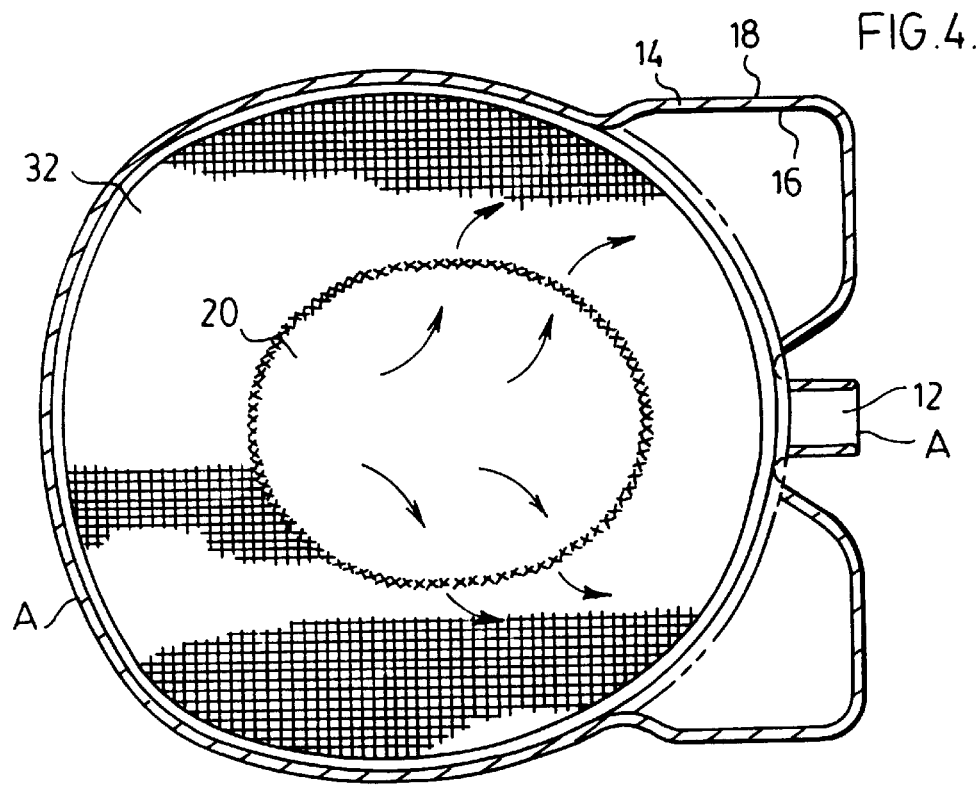
FIG. 4 is a top cross-sectional view of a waste water filter system, taken along the line A—A of FIG. 3.

Reservoir 26 is provided below filter means 20 and provides an area in which water may accumulate as it flows out of collector body 14 through outflow aperture means 12. In the embodiment shown in FIGS. 3 and 4, when installed, reservoir 26 is positioned higher than the downstream conduits which are attached to outflow conduit means 12. Accordingly, the waste water leaving collector body 14 may leave reservoir 26 by gravity feed.

In an embodiment, as shown in FIGS. 1, 2, and 6, the waste water filter system further comprises pump 50 having a motor 51 which is located in reservoir 26 in the flow path between cradle 32 and outflow aperture means 12. Pump 50 is thus a means to propel, or assist in propelling, waste water out of reservoir 26 via outflow aperture means 12. Pump 50 may be most effectively used when reservoir 26 is positioned lower than the location to which the waste water leaving collector body 14 is to be sent, as illustrated in FIG. 6.

In another embodiment, as shown in FIG. 6, collector body 14 may have a drain aperture 13 for facilitating the draining of reservoir 26, for example when the unit is to be removed for servicing. Drain aperture is preferably provided with a threaded cap 13' for releasably sealing drain aperture 13.

As shown in FIG. 6, the waste water filter system of the present invention may be used in association with a flow path of waste water from a kitchen or other place where waste water and grease are produced. In the embodiment of FIG. 6 the illustrated flow path includes grease trap 70, public sewage system 72, sewage vent 68, pipes 60–63, and valves 64–67. Waste water enters pipe 60 from sink 74, or a like source. Valve 64 may be closed and valve 65 may be open to provide a flow path which does not include the waste water filter system. This is desirable for permitting continued use of the sink, for example when the waste water filter system is undergoing maintenance such as removal and replacement of filter means 20.

Alternatively, valve 65 may be closed and valve 64 may be opened to provide a flow path in flow communication with the waste water filter system. In this embodiment, waste water flows through pipe 59 and 61 and into the waste water filter system at inflow aperture means 10. A flexible conduit, for example a hose 68, may be inserted the flow path between sink 74 and inflow aperture means 10. In the embodiment shown in FIG. 6, for example, hose 68 may be inserted in the flow path between pipe 61 and pipe 59, such that waste water flows through pipe 61, through hose 68, through pipe 59, and through inflow conduit aperture 10 into the waste water filter system. The use of a flexible conduit in the flow path prior to the waste water filter system may facilitate installation and movement of the waste water filter system, and may provide greater flexibility in positioning the waste water filter system within the waste water flow path.

In the embodiment shown in FIG. 6, the waste water filter system of the present invention is used in association with optional grease trap 70, which may be located in the flow path downstream the waste water filter system of the present invention. By use of the present invention, grease and solid wastes may be removed prior to the waste water entering grease trap 70. As a result, grease trap 70 may operate more efficiently, and may require a lower frequency of maintenance. When filter means 20 fills with grease and solids, it may be disposed of using a normal solid waste disposal means. Further, there is less chance that the grease trap will prematurely fill will grease and solid material. Thus, less grease may therefore enter the public sewage system, resulting in a reduction in the amount of grease processing at sewage treatment plants.

It will be understood that no limitation of the scope of the invention is hereby intended. While the invention has been disclosed and described with reference to a limited number of embodiments, those skilled in the art will appreciate that the various modifications, variations and additions to the process may be made, and it is therefore intended in the following claims to cover each such variation, addition and modification as falls within the true spirit and scope of the invention. Such alterations and further modifications in the illustrated device, and such applications of the principals of the invention as it is illustrated therein as would normally occur to one skilled in the art to which the invention relates, are considered as included in the invention.

EXAMPLE

A filtration unit as shown in FIGS. 1–6 was provided with a filter bags made by Zens Hosiery Co. and having the following specifications:

Needle count: 401

Cylinder Size: 3½

Start up Yarn: 30/2 Stretch Nylon

Bardy Yarn: 40/1/S stretch nylon 40/1/Z stretch nylon

Run out Yarn: 60/1 Cotton

Knit Length: 16 inches

Finish Length: 12 inches

The filtration unit was placed upstream from a standard grease trap in an industrial kitchen and waste water containing grease and solid organic particulate material was passed therethrough. The concentration of oil and grease in the waste water entering the filtration unit and in the waste water exiting from the filtration unit was measeured. In addition, the biologic oxygen demand (BOD) and the total suspended solids (TSS) in the waste water entering the filtration unit and in the waste water exiting from the filtration unit was also measeured. The results are set out below.

| Parameter | Sample Concentrations | | | | | |
|---|---|---|---|---|---|---|
| | Test #1 into Rino | Test #1 Out of Rino | Coefficient of Efficiency | Test #2 into Rino | Test #2 Out of Rino | Coefficient of Efficiency |
| Oil and Grease | 3.54% | 0.07% | 98% | 4.98% | 1.18% | 76% |
| BOD | 2,400 PPM | 1,470 PPM | 39% | 3,000 PPM | 1,760 PPM | 41% |
| TSS | 14,567 PPM | 747 PPM | 95% | 3,557 PPM | 2,967 PPM | 17% |

As can be seen from the foregoing table, the filtration unit was surprisingly efficient in removing not only solid material from the waste water but also in removing a large proportion of the oil and grease from the waste water.

I claim:

1. A waste water filter system for removing solid organic particulate matter and grease from waste water comprising:
   (a) a collector body (14) having an inflow aperture (10) for receiving the waste water, an outflow aperture (12) and an inner surface (16), said collector body defining a flow path for the waste water extending in a forward flow direction from said inflow aperture, through said collector body, and out said outflow aperture;
   (b) a removable filter (20);
   (c) a retainer (54) for releasably securing said removable filter in said collector body;
   characterized in that said removable filter is expandable as it fills, said removable filter is suitable for removing a portion of the solid organic particulate matter and grease from the waste water, said removable filter positioned in said collector body between said inflow aperture and said outflow aperture, said removable filter having an outer surface (24) and a reservoir (22) for storing the solid organic particulate matter and grease removed from the waste water, said removable filter sized so that, when said reservoir is full, at least a portion of said outer surface of said removable filter is spaced from said inner surface of said collector body and defines a passageway (26) in flow communication with said outflow aperture.

2. The waste water filter system as claimed in claim 1 characterized in that said removable filter comprises an elastic material.

3. The waste water filter system as claimed in claim 2 characterized in that said elastic material stretches in both the machine direction and the cross direction.

4. The waste water filter system as claimed in claim 1 characterized in that said removable filter comprises a grease retaining fabric.

5. The waste water filter system as claimed in claim 1 characterized in that said removable filter has a needle count from about 300 to about 500.

6. The waste water filter system as claimed in claim 1 characterized in that said removable filter has a needle count from about 300 to about 400.

7. The waste water filter system as claimed in claim 1 characterized in that said openings in the removable filter are sized to retain more than 50% of the grease and particulate matter that enters the waste water filter system.

8. The waste water filter system as claimed in claim 1 characterized in that said openings in the removable filter are sized to retain more than 75% of the grease and particulate matter that enters the waste water filter system.

9. The waste water filter system as claimed in claim 1 characterized in that said removable filter comprises a filter bag having an inflow aperture (43) in flow communication with said inflow aperture of said collector body whereby said waste water flows through said inflow aperture of said collector body, through said inflow aperture of said filter bag and through said removable filter with at least a portion of the particulate matter and grease remaining in said removable filter.

10. The waste water filter system as claimed in claim 9 characterized in that said collector body has a disposal aperture sized to permit the removal of said removable filter when said removable filter is full particulate matter and grease, and said retainer for releasably securing said removable filter in said collector body comprises a member for releasably securing said inflow aperture of said removable filter bag in flow communication with said inflow aperture of said collector body and a member (52) for releasable covering a disposal aperture (28).

11. The waste water filter system as claimed in claim 10 characterized in that said waste water filter system further comprises a support (32) for supporting a portion of said removable filter as said removable filter is filled.

12. The waste water filter system as claimed in claim 1 characterized in that said removable filter has openings sized to prevent at least a portion of the particulate matter and grease from flowing therethrough.

13. The waste water filter system as claimed in claim 1 characterized in that said waste water filter system further comprises a pump (50) positioned in said flow path upstream of said outflow aperture for pumping the waste water through said outflow aperture.

14. A waste water filter system suitable for removing particulate matter from waste water, said waste water filter system including a waste water supply line (59) in flow communication with a source of waste water containing particulate matter and characterized in that the waste water supply line is in flow communication with:
   (a) a filtration unit comprising:
      (i) a collector body (14) having an inflow aperture (10) for receiving the waste water, an outflow aperture

(12) and an inner surface (16), said collector body defining a flow path for the waste water extending in a forward flow direction from said inflow aperture, through said collector body, and out said outflow aperture; and (ii) an expandable removable filter (20) suitable for removing particulate matter from the waste water, said removable filter positioned in said collector body between said inflow aperture and said outflow aperture, said removable filter having an outer surface (24) and a reservoir (22) for storing the particulate matter and grease removed from the waste water; and, (b) a grease trap positioned downstream from said filtration unit;

whereby the waste water exiting said filtration unit contains a reduced amount of particulate matter and a reduced amount of particulate matter lodges in the grease trap.

\* \* \* \* \*